United States Patent [19]

McEowen

[11] 3,906,168

[45] Sept. 16, 1975

[54] VISUAL STATUS INDICATOR CIRCUIT

[75] Inventor: James Royce McEowen, Holmdel, N.J.

[73] Assignee: Bell Telephone Laboratories, Incorporated, Murray Hill, N.J.

[22] Filed: Dec. 12, 1973

[21] Appl. No.: 426,643

[52] U.S. Cl. .................................. 179/84 L; 179/99

[51] Int. Cl. ............................................ H04m 1/22

[58] Field of Search ........ 179/99, 81 R, 81 C, 84 L, 179/84 R, 28, 27 E, 27 FC, 27 DB, 18 FH; 250/215; 240/2.17

[56] References Cited

UNITED STATES PATENTS

| | | | |
|---|---|---|---|
| 3,141,068 | 7/1964 | Cleary et al. | 179/81 C |
| 3,412,213 | 11/1968 | McCay | 179/81 C |
| 3,459,900 | 8/1969 | Alster et al. | 179/84 L |
| 3,733,442 | 5/1973 | Lee | 179/99 |

*Primary Examiner*—William C. Cooper
*Assistant Examiner*—Gerald L. Brigance
*Attorney, Agent, or Firm*—David H. Tannenbaum

[57] ABSTRACT

Multiple telephone line service is provided to a subscriber station served directly from a telephone central office by an extremely simplified circuit arrangement which reduces to a minimum the number of components necessary to provide visual indications of the status of the lines. A light emitting diode (LED) is serially inserted in the line circuit at a strategic point to supply visual signals. An arrangement is also shown whereby the display changes color depending upon the status of the line.

18 Claims, 3 Drawing Figures

VISUAL STATUS INDICATOR CIRCUIT

FIELD OF THE INVENTION

This invention relates to telephone systems and, more particularly, to an arrangement for providing multiline service to a subscriber served directly from a central switching network.

BACKGROUND OF THE INVENTION

The problem to be overcome is the design of a telephone station system for use in small business or home environments where each station has access to more than one line. Traditionally, telephone arrangements where a number of lines are accessed from a single station instrument are called key telephone systems and are used primarily in commercial environments. In such systems, line circuits such as the line circuit shown in U.S. Pat. No. 3,436,488, issued to R. E. Barbato and D. T. Davis on Apr. 1, 1969, are connected between the station and the switching network for the purpose of controlling the connection. Such line circuits require logic circuitry and operate from power supplied at the customer premises (local power). At least one of these circuits, plus a power source, is required for each line serving the system and, thus, the cost to the subscriber becomes an important factor in determining whether or not a multiline pickup system is to be installed.

Although the basic goal is simply stated, the solution is dependent upon the perception and analyzation of several problems inherent in providing a very small multiline telephone system. One such problem is the fact that the small business or home environment does not have the space to mount central line equipment and, even if space were available, it is usually difficult at best to run the large number of wires which are typically necessary with line card controlled key telephone systems.

Another problem is that the system must also be easy to operate and must be self-explanatory since training of attendants is not feasible in the environment in which such a system is to be used. Further problems arise when local power sources are to be avoided, since if the system is to operate from central office power care must be taken to insure operation within all permissible line loop lengths without requiring range extension equipment.

Keeping in mind the severe limitations placed on such a small telephone system, several basic requirements must be met if a single telephone station is to have access to a number of lines. First, such a system must have central office powered visual displays so that the subscriber knows at all times which line or lines are active. Second, there must be provided a hold bridge operable to maintain any line active so that the subscriber, busy on one line, may place or receive a call on another line. And, third, such a system must have a key arrangement for allowing a subscriber to choose which line will be connected to and to allow the subscriber to enable the hold function with respect to a given line.

The visual display requirement is difficult to achieve since inherent in such a display is the utilization of power. Also, since all telephone stations associated with the same line must display the same visual signal to the subscriber, some arrangement must be provided to control such multiple signals. Further, since it is traditional that the ringing condition visual display is a flashing signal, some arrangement must be made to provide such a signal, all without the use of a central line circuit and without central control.

Accordingly, it is an object of my invention to provide a simplified visual signaling system operable among a number of stations for communicating the calling status of an associated line to a subscriber without utilizing local power.

It is a further object of my invention to provide such an arrangement at each station of a multistation system without necessitating a central control circuit to control the visual display at the various stations.

SUMMARY OF THE INVENTION

In my copending application (J. R. McEowen 10), Ser. No. 426,648, filed concurrently herewith, I have disclosed an extremely simplified hold bridge which meets all of the requirements imposed on small telephone multiline systems. In the instant application, in the embodiment shown, I have disclosed and provided a detailed discussion of the visual signaling arrangement which allows a subscriber at any number of telephone station sets to know the calling status of any of the lines associated with that station. Thus, for example, assuming a two-station system, each station having the capability of picking up either of two lines, the system would be arranged with two light emitting diodes (LED) at each station, one diode associated with each line.

The LED's are constructed to be bipolar and are each connected into the respective communication leads to the station such that upon the application of ringing voltage to the line the LED associated with that line flashes under power of the applied voltage, thereby providing visual indications of the active ringing condition of the associated line. During the off-hook talking interval, the associated LED provides a steady visual signal, relying on talking battery for its power source.

While the circuit shown, once taught, is the essence of simplicity, it achieves the desired visual signaling result and operates exclusively from central office supplied power. The strategic placement of the LED in each line at a point where both ringing current and line current pass therethrough is the foundation of the operation of the simplified visual display. When this concept is extrapolated whereby a number of stations can be connected together, each giving the same visual display without requiring a circuit central to those stations, as in the past, a telephone system results which allows multiline pickup at very little additional cost to the provision of basic telephone service.

When the station goes into the hold mode where the station is in the on-hook but active condition, the LED associated with the line on hold continues to light in a continuous or nonflashing manner. In one embodiment of my invention I have shown a circuit arrangement whereby different colors are used to provide a subscriber with line status information. Under this arrangement, flashing yellow is used to indicate a ringing condition; red is used to show a busy condition; continuous yellow denotes a hold enabled (set still off-hook) condition; while green shows a hold enabled (set on-hook) mode. These color combinations are achieved by combining into a single unit two LED's, each in a bipolar fashion and each having a different light emission frequency. By selectively energizing sections of the combined LED's, the different colors are obtained.

DESCRIPTION OF THE DRAWING

The operation and utilization of the present invention will be more fully apparent from the following description of the drawing, in which.

DETAILED DESCRIPTION

Figure 1:
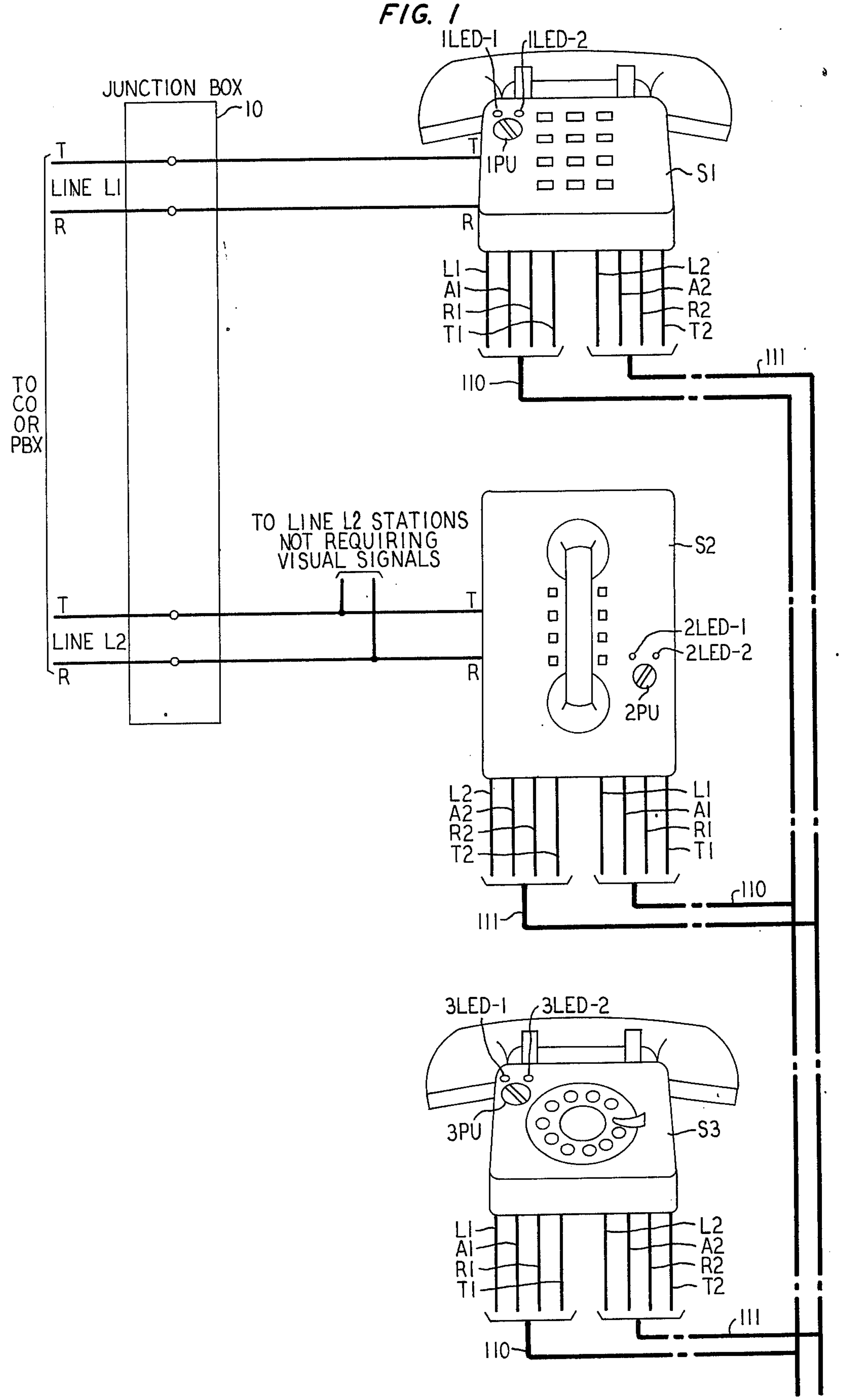
FIG. 1 shows in pictorial format three telephone stations connected to two central office lines.

In FIG. 1 there is shown two communication pairs of lines extending directly to a central office or PBX switching network. These lines, line L1 and line L2, are extended through junction box 10 to two of the station sets shown. As shown, line L1 is extended to station S1 while line L2 is extended to station S2 and both of these lines can be connected to any of the three stations shown by means of a selector key at each of the stations.

Supplementing the basic pair of communication leads which must be run to the stations for each line, there is a four-conductor cable which interconnects each telephone station capable of picking up that line. Thus, for example, in a two-line system there are two cables of four wires each which must interconnect all of the stations which pick up those lines. In a three-line system, in addition to the three incoming communication lead pairs, three cables of four wires each would be necessary to interconnect the stations. Also, it is important to note that the number of telephone stations is independent of the number of incoming lines serving the system and that although three such stations are shown any number of stations can be connected to the system by connecting to the respective four-conductor cable. Stations which are arranged to pick up only one line may be connected across the T and R leads of that line in the conventional manner without interfering with the operation of the visual signal system. Alternatively, such nonvisual stations may be connected between leads T1(T2) and A1(A2) to provide a visual busy signal to the lamp-equipped stations when one or more of the former are off-hook.

Each of the multiline stations is equipped with a pickup key such as pickup key 1PU associated with station S1. Each such key has as many positions as there are lines connectable to that station. Thus, since station S1 is arranged to pick up two separate incoming lines, pickup key 1PU has two positions. For convenience, this key is shown as a twist key with the leftmost position being associated with line L1 and the adjacent right position being associated with line L2. Associated with each position of the switch there is a light emitting diode mounted so as to be visible, through the face plate, to a subscriber using the telephone station. Thus, associated with position 1 of pickup key 1PU at station S1 there is shown light emitting diode 1LED-1, and associated with position 2 of pickup key 1PU there is shown light emitting diode 1LED-2.

In the situation where a call is incoming on line L1, the light emitting diode associated with line L1 on each of the station sets flashes. When the call is answered at any of the stations by turning the pickup key to position 1 and removing the handset from the switchhook, the light emitting diodes which were flashing become lighted in a visually solid or steady manner at all of the stations.

A subscriber at any station may place an active line on hold merely depressing or pushing in the pickup key prior to turning the key from the position associated with the currently active line to the position associated with another selected line. In this situation, the light emitting diode associated with the line on hold continues to provide a steady visual display and because of the active condition of the newly selected line the light emitting diode associated with the selected line at each of the stations lights in a steady manner.

INCOMING CALLING CONNECTION

Figure 2:
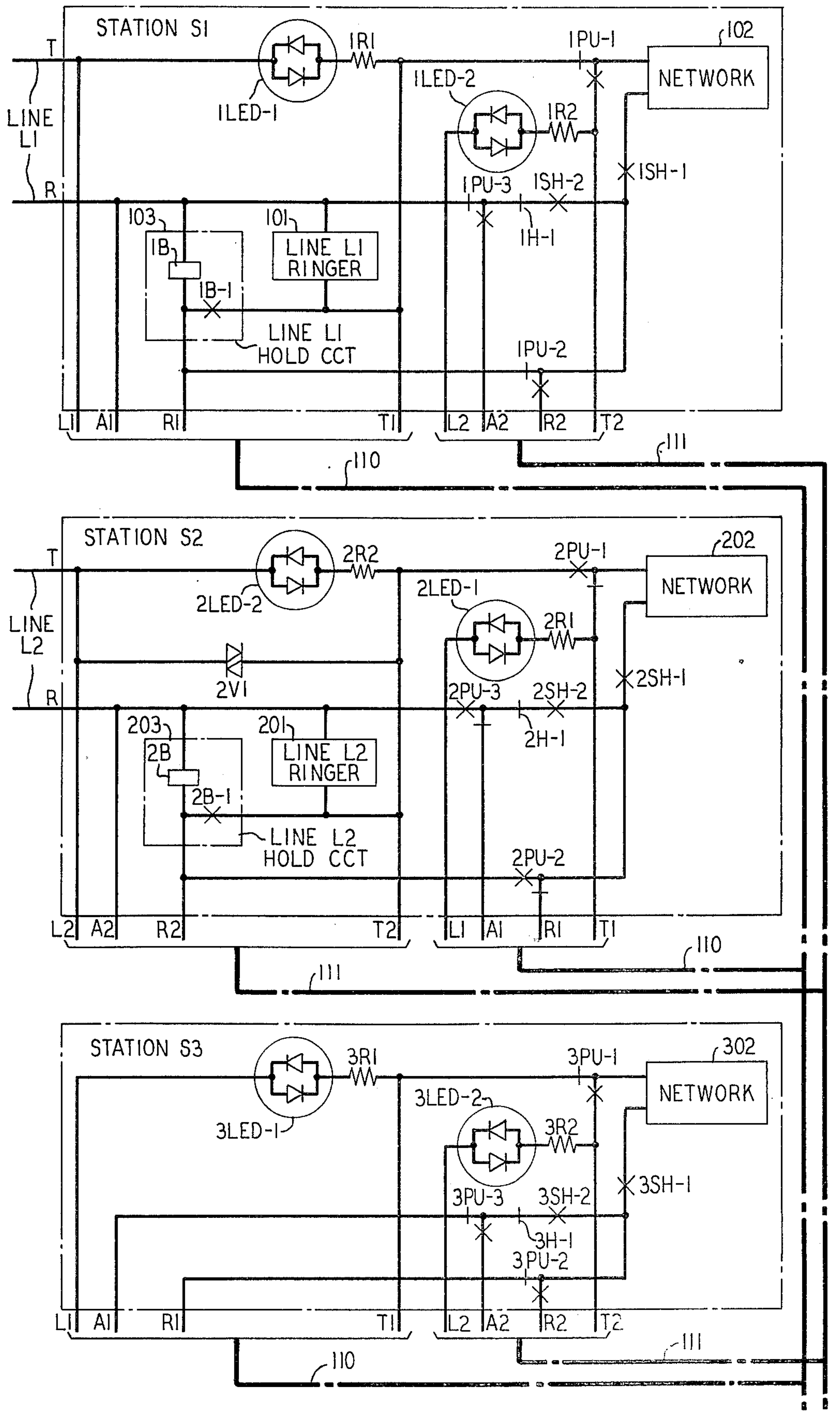
FIG. 2 is a schematic drawing showing in greater detail the circuitry of the invention.

Turning now to FIG. 2, the details of the circuitry arranged to accomplish the foregoing visual control with respect to stations S1, S2 and S3 will now be discussed. Since the system, as shown, is a two-line system, the pickup key is also a two-position key. For convenience, therefore, each pickup key contact such as contact 1PU-1 of station S1 is shown as a make and break transfer pair and is adapted so that when the switch is in the line L1 position it is in the normal mode where current may pass through the break contact and not through the make contact. When the pickup key is turned to the line L2 position, the make contact of the pickup key closes while the break contact opens. This arrangement is shown for purposes of clarity and, of course, it is recognized that a pair of make contacts, each associated with one of the line positions, could also be utilized in the same manner.

Assume now an incoming call on line L1. Accordingly, alternating or pulsating voltage potentials are provided over the T and R communication leads from the central office, which voltage causes current to flow from the T lead through bipolar light emitting diode 1LED-1 and current limiting resistor 1R1 through line L1 ringer 101 and back to the central office over the R lead of line L1, thereby operating the ringer. Since the handset (not shown but included as part of network 102) is on the switchhook, the ringing current does not pass through network 102. Of course, had the handset been off-hook, the line would have tested "busy" and, therefore, the incoming ringing current would not have been applied. Upon application of ringing potential on line L1, light emitting diode 1LED-1 operates in a pulsating or flashing manner under control of ringing current passing through the light emitting diode and line L1 ringer 101, thereby providing a visual display at station S1 showing the active ringing condition of line L1.

At the same time, ringing potential is supplied from lead T over lead L1 of cable 110 to station S2, which ringing current passes through light emitting diode 2LED-1 and limiting resistor 2R1 and back over lead T1 of cable 110 to station S1 and through line L1 ringer 101 to the R lead of the communication pair. Thus, at station S2, light emitting diode 2LED-1 associated with line L1 also flashes. Similarly, at station S3, light emitting diode 3LED-1 associated with line L1 also flashes from current supplied over leads L1 and T1 of cable 110. Accordingly, upon the application of ringing current to line L1 the light emitting diodes associated with line L1 at each of the stations flash, indicating a ringing condition with respect to line L1 answerable from any of the stations. Also, an audible signal is provided to the subscriber only at station S1, which station should, if possible, be located at a physical location whereby audible signals generated thereat can be heard at the locations of the other stations. Alternatively, the line L1 ringer and/or additional ringers may be located, either within or external to telephone sets, such that ringing can be heard by all parties.

ANSWERING OF CALLING CONDITION

Assume now that it is desired to answer the calling condition on line L1 from station S3. Accordingly, pickup key 3PU of station S3 is turned to position 1, which it will be recalled is the normal position of that key and the handset associated with station S3 is removed from the switchhook, thereby enabling the switchhook contacts. When this occurs, network 302 becomes connected to lead T1 of cable 110 via the released break contact of pickup key contact 3PU-1. Network 302 also becomes connected to lead A1 of cable 110 via the enabled switchhook contacts 3SH-1 and 3SH-2, released hold break contact 3H-1 and released pickup key contact 3PU-3. Accordingly, network 302, which network represents the transmitting and receiving transducers and the station dialing apparatus, all arranged in the conventional manner, is bridged across the A1 and T1 leads of cable 110, which in effect places network 302 across the T and R leads of line L1 as shown in station S1 with the parallel combination of light emitting diodes 1LED-1, 2LED-1 and 3LED-1 in series therewith. At this point, in the conventional manner, the central office ringing potential is removed and line current is provided over the T and R leads of line L1, which line current is extended over lead T through light emitting diode 1LED-1 and limiting resistor 1R1 to the T1 lead of cable 110 and through network 302 of station S3 which is bridged across leads T1 and A1 of cable 110 back through lead R of line L1. Thus, the light emitting diode 1LED-1 provides a steady visual indication. At the same time, line current is provided over lead L1 of cable 110 to station S3, which line current is extended from light emitting diode 3LED-1 and limiting resistor 3R1 to the T1 lead. Thus, the light emitting diode of station S3 associated with line L1 also lights in a steady manner. Since at station S2 the light emitting diode 2LED-1 is also in parallel across the T1 and L1 leads of cable 110, that diode also lights in a steady manner. Accordingly, in response to the selection of line L1 from station S3, the light emitting diodes of all three stations associated with line L1 provide a steady visual signal of the off-hook condition of line L1.

CALLING CONNECTION FROM SECOND LINE

Assume now that a subscriber at station S2 desires to place an outgoing call. The subscriber observes the two light emitting diodes at station S2 to determine which line, if any, is idle. Upon seeing the lighted condition of the light emitting diode associated with line L1, the subscriber then turns the pickup key to the line L2 position and goes off-hook. Accordingly, network 202 of station S2 is connected via enabled make contact 2PU-1 through light emitting diode 2LED-2 to the T lead of line L2. The network is also connected via enabled make contact 2PU-1 to lead L2 of cable 111. At the same time, network 202 is connected via enabled switchhook contacts 2SH-1 and 2SH-2, released hold contact 2H-1 and enabled make contact 2PU-3 to the R lead of line L2, and to the A2 lead of cable 111. Since network 202 is now across the T and R leads of line L2, the central switching network recognizes the off-hook condition with respect to that line and provides dial tone and talking battery in the conventional manner. Light emitting diode 2LED-2 thereupon lights in a steady manner under control of line current provided over line L2 from the central switching network.

Since network 202 is also connected across leads L2 and T2 of cable 111, the light emitting diode associated with line L2 at station S1, namely, 1LED-2, and the light emitting diode associated with line L2 of station S3, namely, 3LED-2, both operate in a steady manner indicating the busy condition of line L2.

Note that, as shown with respect to station S2, a varistor, such as varistor 2V1, can be added across the light emitting diode for the purpose of protecting the diode from voltage surges. Since the varistor is parallel with all of the LED's on the same line, only one such varistor is necessary for each line.

HOLD BRIDGE VISUAL INDICATIONS

As noted earlier, in my copending application a hold circuit is shown which provides a bridge across a selected line for the purpose of holding the connection in an active noncommunicating manner. The hold bridge impedance is the winding of the B relay of the hold circuit associated with the line on hold, which for line L1 is relay 1B of line L1 hold circuit 103. When this bridge is placed across the T and R leads, in the manner detailed in my copending application, current flows from the T lead of line L1 through light emitting diode 1LED-1 and via enabled make contact 1B-1 through the winding of the B relay and back over the R lead. Thus, even when a station enables the hold bridge, a visual indication of the busy condition of the associated line is provided. Since leads A1 and T1 of cable 110 are essentially in parallel with light emitting diode 1LED-1 and since these leads connect light emitting diodes 2LED-1 and 3LED-1 of stations S2 and S3 in parallel, all three light emitting diodes light in a steady manner, providing visual indications of the status of the associated line.

MULTICOLORED VISUAL SIGNALS

Figure 3:
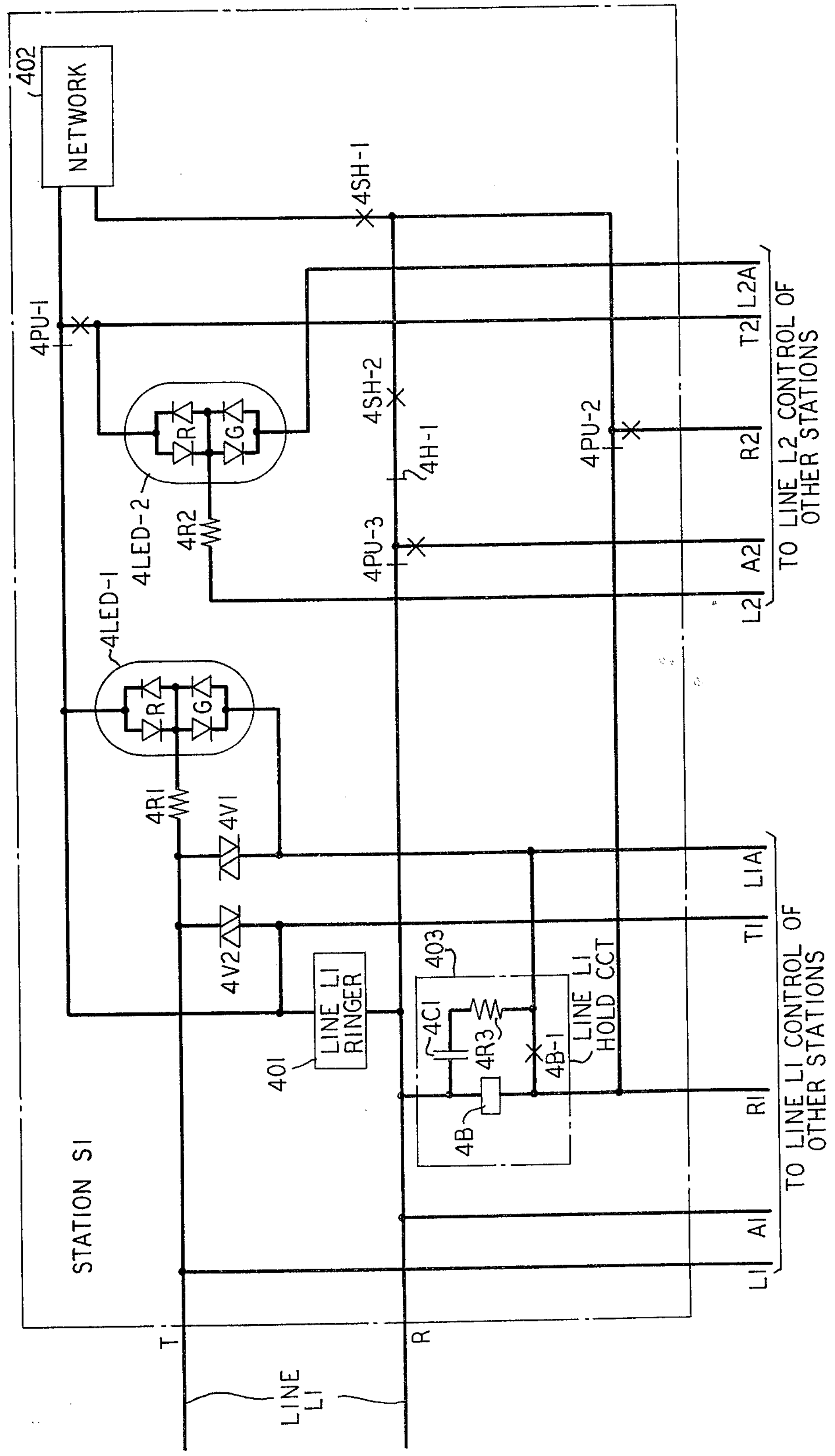
FIG. 3 shows in schematic form the circuity arranged to provide multicolored visual signals.

In FIG. 3 there is shown circuitry for providing multicolored visual signals to indicate the calling status of station S1. The multicolored signals are provided by a dual bipolar light emitting diode, such as light emitting diode 4LED-1, having a red (R) bipolar section and a green (G) bipolar section. The red section is activated from line current supplied over the T lead through the red section and through either network 402 to the R lead, or through the red section and via line L1 ringer 401 to the R lead. The green section is activated from line current provided over the T lead through the green section and through the activated line L1 hold circuit 403 to the R lead.

As shown, in line L1 hold circuit 403 there is an ac current bypass which consists of capacitor 4C1 and resistor 4R3. However, if a second ringer is required on the line, it may serve as the current bypass. During the ringing interval, alternating line current passes through the red section of light emitting diode 4LED-1 and through line L1 ringer 401 to the R lead, thereby operating the ringer. At the same time, the alternating current passes from the T lead through the green section of light emitting diode 4LED-1 and via the ac bypass of line L1 hold circuit 403 to the R lead. Thus, in the ringing interval, light emitting diode 4LED-1 flashes under line current with a yellow color, yellow being the combination of red and green.

When station S1 goes off-hook with the pickup key in the line L1 position, current passes from the T lead through the red section of light emitting diode 4LED-1 and through released break contact 4PU-1 through network 402 and enabled switchhook contacts 4SH-1 and 4SH-2 and released hold contact 4H-1 and released contact 4PU-3 to the R lead. Thus, when line L1 is in the talking mode, light emitting diode 4LED-1 provides a steady red signal. This red signal is repeated at all other stations having multicolored lights.

Since the hold key must be operated prior to the time when the pickup key is operated, network 402 and line L1 hold circuit 403 are temporarily in parallel across the T and R leads and, thus, both sections of light emitting diode 4LED-1 operate, providing a continuous yellow signal as an indication of the off-hook hold enabled condition. In such a situation, the circuit path for the red section of the light emitting diode is through the T lead and through the red section of light emitting diode 4LED-1, break contact 4PU-1, network 402, enabled switchhook contact 4SH-1, released break contact 4PU-2, and through the winding of relay 4B to the R lead. Since relay 4B operates from current flowing through the winding thereof, the green section of light emitting diode 4LED-1 is operated from current flowing from the T lead through the green section and through enabled make contact 4B-1 and the winding of the 4B relay to the R lead.

When the subscriber turns the pickup key to the other line position, network 402 is removed from the circuit of line L1 and current stops flowing through the red section of light emitting diode 4LED-1 thereby changing the visual signal to a green indication showing that the hold circuit is enabled and the network is on-hook with respect to line L1.

It should be noted that the removal of the ac bypass from line L1 hold circuit 403 results in the operation of only the red section of light emitting diode 4LED-1 when line ringing current is applied, thereby changing the visual indication associated with a ringing condition from flashing yellow to flashing red. Also note that varistors 4V1 and 4V2 are provided for the purpose of voltage surge protection and current equalization of the associated sections of the light emitting diode, which varistors may be removed if such protection or equalization is not necessary, thereby even further simplifying the circuit.

CONCLUSION

While in the embodiment discussed a three-station two-line system is shown, the invention is not confined to use in such a system but can be used with a single station serving one line or many lines, or with a multiple station system serving single or multiple lines. Thus, for example, in some situations it may be desired to eliminate the audible signal completely and rely only upon the flashing lamp to both indicate a ringing condition and a busy condition. This is especially important in situations where there are multiple stations serving the same line and where, without the lamp, a subscriber attempting to use a station would have to lift the handset and listen to the receiver to determine the busy or idle status of the line. My invention overcomes this problem by allowing the subscriber to determine the calling status of any line associated with the station merely by visual observation.

Also, it should be mentioned that the use of bipolar LED's makes the circuitry insensitive to the polarity of talking battery on T and R, since all other components are nonpolar. Thus, a polarity guard is not required. Further, it should be remembered that sources of illumination other than LED's, for example, low-current incandescent lamps, may be used, so long as they are compatible with the current and voltage restrictions of the line. For that matter, liquid crystal display indicators or any other indicators may be used, subject to the above restrictions.

What is claimed is:

1. A subscriber telephone station comprising:

a first pair of communication leads for connecting said subscriber station to a telephone switching network, said subscriber station including a transducing network connectable across said first pair of communication leads and operable for communicating intelligible information to and from said subscriber station over said communication leads, said transducing network being activated from voltage potentials present on said first pair of communication leads from said telephone switching network;

a first ringer connected across said first pair of communication leads and operable for providing audible signals to a subscriber indicating an incoming calling connection, said ringer being activated from pulsating voltage potentials supplied over said first pair of communication leads; and a first current-sensitive light indicating device connected in one lead of said first pair of communication leads at a point in said lead closer to said telephone switching network than the connection of either said transducing network or said first ringer so that said first light indicating device will provide a pulsating visual indication when said first ringer is being activated and will provide a steady visual indication when said transducing means is being activated.

2. The invention set forth in claim 1 wherein said light indicating device is a bipolar light emitting diode.

3. The invention set forth in claim 1 wherein said light indicating device is a liquid crystal display.

4. The invention set forth in claim 1 further comprising:

a second pair of communication leads for connecting said subscriber station to a telephone switching network;

means for connecting said transducing network either to said first pair of communication leads or to said second pair of communication leads;

a second ringer connected across said second pair of communication leads and operable for providing audible signals to a subscriber indicating an incoming calling connection, said ringer being activated from pulsating voltage potentials supplied over said second pair of communication leads; and a second current-sensitive light indicating device connected in one lead of said second pair of communication leads at a point in said lead closer to said telephone switching network than the connection of either said transducing network or said second ringer so that said second light emitting indicating device will provide a pulsating visual indication when said second ringer is being activated and will provide a steady visual indication when said transducing means is being activated from current supplied over said second line.

5. The invention set forth in claim 4 further comprising:

a second subscriber telephone station having a transducing network connectable across either of said pair of communication leads and having a current-sensitive light indicating device associated with each of said communication leads; and means for directly interconnecting said stations so that the light indicating device associated with said second subscriber telephone station and connected in said first pair of communication leads provides visual signals at said second station identical to the visual signals provided at said first station by said first light indicating device associated with said first subscriber telephone station and connected in said first pair of communication leads and so that the light indicating device associated with said second subscriber telephone station and connected in said second pair of communication leads provides visual signals at said second station identical to the visual signals provided at said first station by said second light indicating device associated with said first subscriber telephone station and connected in said second pair of communication leads, both said second station light emitting devices being operable directly from current provided over said respective telephone lines.

6. The invention set forth in claim 5 wherein all said light indicating devices are bipolar light emitting diodes.

7. The invention set forth in claim 5 wherein all said light indicating devices are liquid crystal displays.

8. The invention set forth in claim 5 wherein said first ringer is located physically within said first station, and wherein said second ringer is located physically within said second station.

9. The invention set forth in claim 1 further comprising hold means operable for connection across said first pair of communication leads and wherein said light indicating device is connected in series with said hold means so that when said hold means is enabled current passes through said light indicating device in a steady manner thereby providing a steady visual indication.

10. The invention set forth in claim 1 further comprising an alternating current bypass and wherein said light indicating device includes a first section operable for providing a first color indication and a second section operable for providing a second color indication;

said first section of said light indicating device being connected in said one lead of said first pair of communication leads in series with said transducing network and with said ringer so that when said transducing network is being activated only said first section of said light indicating device is operated to provide a first color indication; and said second section of said light indicating device being connected across said first pair of communication leads by said alternating current bypass when pulsating voltages are applied to said first pair of communication leads from said telephone switching network so that when said ringer is activated both said first and second sections of said light indicating device are operated concurrently to provide a third color indication, which third color indication is a combination of said first and second color indications and said third color indication being provided in a pulsating manner.

11. The invention set forth in claim 10 further comprising hold means operable for connection across said first pair of communication leads and wherein said second section of said light indicating device is connected in series with said hold means so that when said hold means is enabled and said transducing network remains connected across said communication leads said third color indication is produced by said light indicating device, and when said hold means is enabled and said transducing network is removed from across said first pair of communication leads said second color indication is produced by said light indicating device.

12. The invention set forth in claim 10 wherein said light indicating device comprises a pair of bipolar light emitting diodes.

13. A visual status indicator circuit for use in a telephone switching system wherein communication connections are established directly from a telephone switching network over a pair of communication leads to a subscriber station, said status indicator circuit comprising:

a transducing network connectable across said communication leads and operable for communicating intelligible information to and from said subscriber station over said communication leads, said transducing network being activated from direct current present on said pair of communication leads from said telephone switching network;

a ringer connected across said pair of communication leads and operable for providing audible signals to a subscriber station indicating an incoming calling connection, said ringer being activated from bipolar voltage potentials supplied over said communication leads; and a bipolar light indicating device connected in series in one lead of said pair of communication leads at a point in said lead between said telephone switching network and said ringer and between said telephone switching network and said transducing network so that said bipolar light indicating device provides pulsating visual indications from current supplied over said lead when said ringer is being activated and provides a steady visual indication from current supplied over said lead when said transducing network is being activated.

14. The invention set forth in claim 13 wherein said light indicating device is a bipolar light emitting diode.

15. The invention set forth in claim 13 wherein said light indicating device is a liquid crystal display.

16. The invention set forth in claim 14 wherein said light indicating device includes a first section operable for providing a first color indication and a second section operable for providing a second color indication;

said first section of said light indicating device being connected in said one lead of said pair of communication leads in series with said transducing network and with said ringer so that when said transducing network is being activated only said first section of said light indicating device is operated to provide a first color indication; and said second section of said light indicating device being connected across said pair of communication leads when pulsating voltages are applied to said pair of communication leads from said telephone switching network so that when said ringer is activated both said first and second sections of said light indicating device are operated concurrently to provide a third color indication, which third color indication is a combination of said first and second color indications and said third color indication being provided in a pulsating manner.

17. The invention set forth in claim 16 wherein said second section connection to said communication leads includes an alternating current bypass, said bypass comprising a series connection of a capacitor and resistor connected between said second section of said light indicating device and one lead of said communication lead.

18. The invention set forth in claim 17 wherein said second section connection to said communication leads includes an alternating current bypass, said bypass comprising a second ringer connected between said second section of said light indicating device and one lead of said communication lead.

* * * * *